Aug. 30, 1966 D. W. SOBEK 3,269,342
METHOD FOR RAISING SUBMERGED OBJECTS
Filed Oct. 5, 1965 3 Sheets-Sheet 1
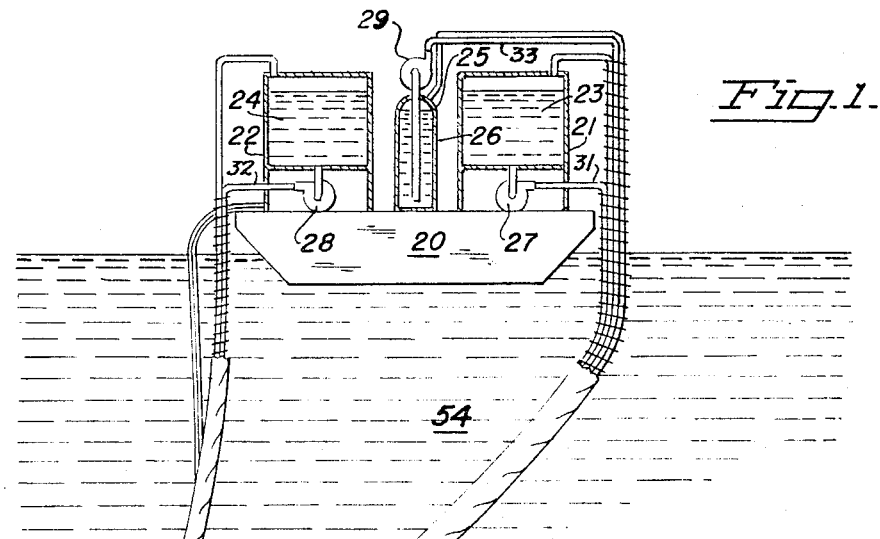
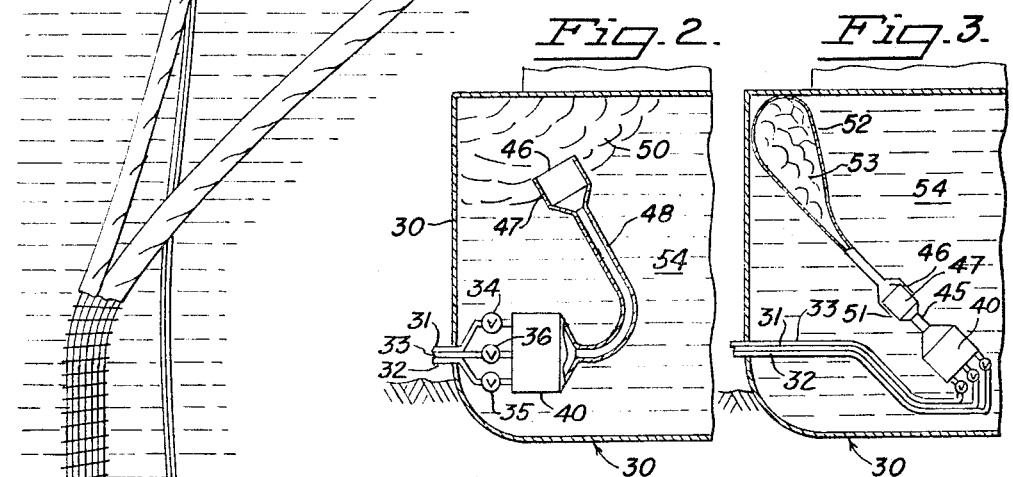
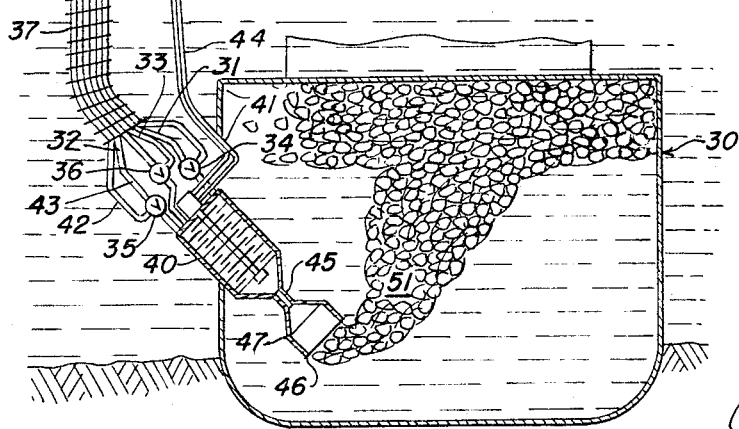
INVENTOR
DALE W. SOBEK
BY
Owen, Wickersham & Erickson
ATTORNEYS Aug. 30, 1966  D. W. SOBEK  3,269,342
METHOD FOR RAISING SUBMERGED OBJECTS
Filed Oct. 5, 1965  3 Sheets-Sheet 2
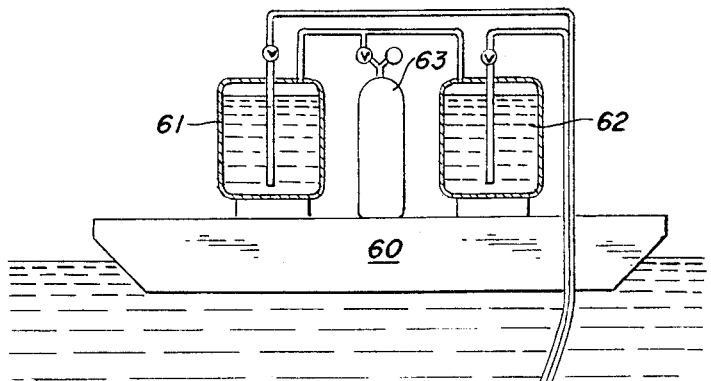
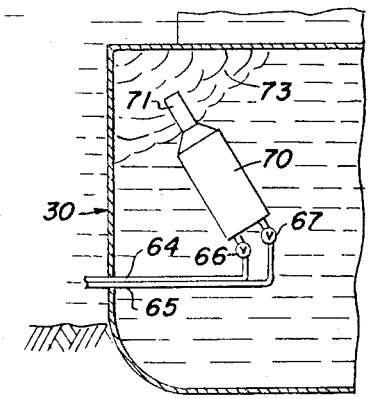
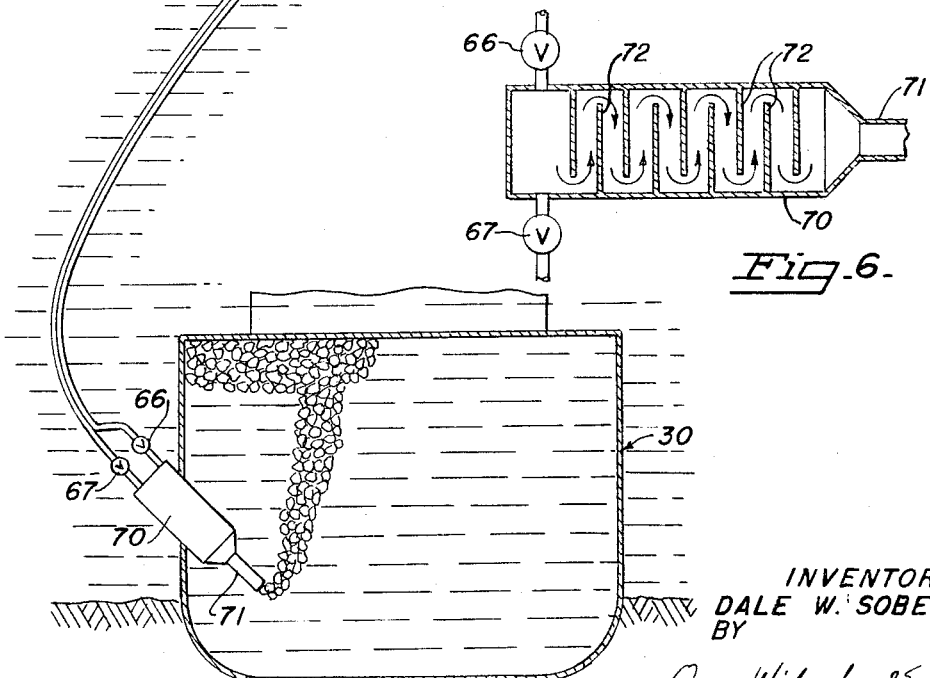
INVENTOR
DALE W. SOBEK
BY
Owen, Wickersham & Erickson
ATTORNEYS Aug. 30, 1966  D. W. SOBEK  3,269,342
METHOD FOR RAISING SUBMERGED OBJECTS
Filed Oct. 5, 1965  3 Sheets-Sheet 3
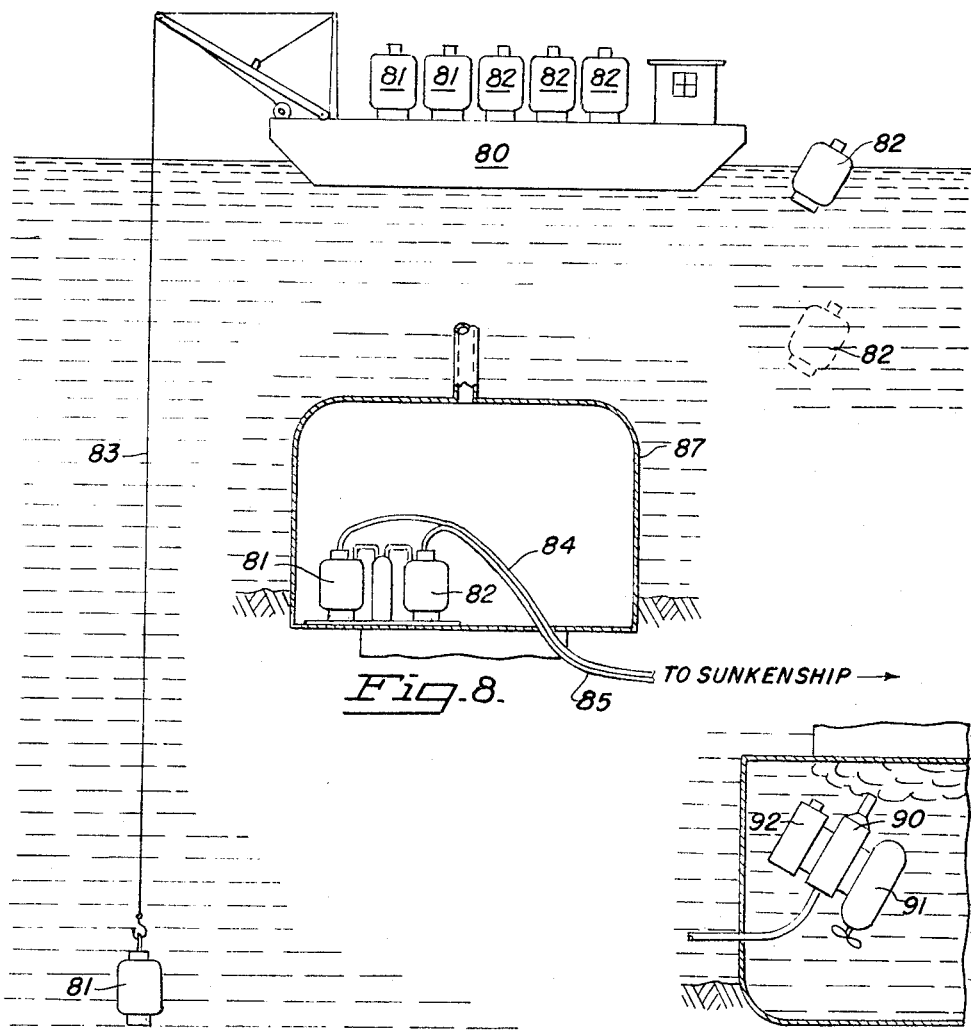
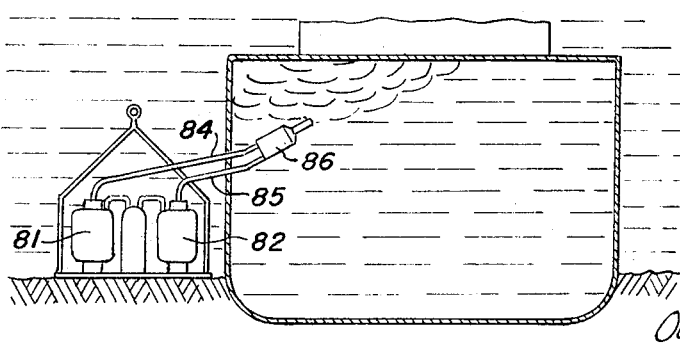
INVENTOR
DALE W. SOBEK
BY
Owen, Wickersham & Erickson
ATTORNEYS

United States Patent Office 3,269,342
Patented August 30, 1966

3,269,342
METHOD FOR RAISING SUBMERGED OBJECTS
Dale W. Sobek, Oakland, Calif., assignor to Polytron Company, Richmond, Calif., a corporation of California
Filed Oct. 5, 1965, Ser. No. 493,104
10 Claims. (Cl. 114—50)

This invention relates to a new method for raising submerged objects such as sunken vessels by the use of closed cell plastic foam.

The present invention restores buoyancy to the submerged object or vessel itself without resorting to the use of secondary mechanical apparatus such as pontoons or air-filled balloons. Further, my new method enables the use of low cost, simple and highly portable equipment, so that it can be advantageously employed under emergency conditions and in remote areas, where conventional floatation schemes are impractical or unavailable.

William Watson, in U.S. Patent 3,091,205 of May 28, 1963, describes a technique wherein plastic foam of closed cell form is pumped into a cavity of a sunken vessel where it is supposed to expand and thereby to displace the water from the cavity and impart buoyancy to the vessel. The Watson patent calls for "foam-in-place" plastic materials such as polyurethanes, epoxides, and formaldehyde resins, admixed with a suitable expanding agent. Watson calls for a fluid resin and a fluid catalyst to be separately pumped in a rather dense state from storage containers located above the water surface to a mixing head under water located within or near the cavity into which the plastic foam is to be placed. At that location, the product is to be dispersed as a liquid within said cavity, in order to expand thereafter and so provide buoyancy.

Unfortunately, the commercial utility of such a system as that of the Watson patent is limited by the fact that the water within the vessel tends to interact with the plastic materials and otherwise to interfere with the foaming process of the reactants. Also, the chemical nature of many plastic foaming products is such that contact with water inhibits or interferes with foaming action by virtue of preferential reaction of the components with water or by virtue of their substantial solubility or dispersibility in water.

Further, in order to form a viable foam structure, virtually all plastic foaming products rely upon the exothermic heat developed in the course of polymerization to expand the mass or to assist in expanding it and also to cure the expanded mass sufficiently for it to have the strength needed to withstand variations in water pressure, whether such pressure changes result from wave action or from the raising of the sunken structure with consequent reductions in the hydrostatic head. Without such heat-produced cure the material is too weak for satisfactory use and without such heat the material fails to expand to a condition of maximum buoyancy. In most areas of the world, sea and lake water temperatures range from approximately 36° to 65° F., a temperature range far below proper cure temperatures for the resinous materials forming the cellular plastic buoyancy product of the Watson patent.

Still further, the dispensing of a plastic foam-forming product into the water in high density liquid form results in an undesirable surface-to-volume ratio, which is conducive to rapid transfer of the exothermic heat developed by the reacting products into the surrounding water, thus retarding the curing process and interfering with the desired formation of a rigid, unicellular buoyancy material. Moreover, water can readily penetrate this uncured mass, and, when it does so, it causes bursting of the cells.

The present invention solves these problems and eliminates the above difficulties by injecting the liquid plastic foam-forming components into the cavity within which buoyancy is to be imparted as a froth, by causing these reactants to pre-expand within processing equipment. Froth is an inflated structure of already substantially expanded cellular form and of very low specific gravity, e.g., 0.04 to 0.14 and typically 0.07 to 0.09. Froth is typically made by first mixing into the plastic components a liquid gas such as dichlorodifluoromethane or monochlorodifluoromethane or some other gas that boils at a very low temperature. Then, the pressure which keeps these gases in their liquid state is reduced and a violent boiling reaction occurs which pre-expands the plastic materials to mechanically unicellular structure. The *pre-forming* of the cellular structure *within controlled confines* and *then* dispensing it into the sunken vessel, substantially reduces the total contact of the liquid reactants with the water and thereby minimizes any chemical interaction with the water. Further, the pre-expanded froths resulting from practice of this invention have a relatively low coefficient of thermal conductivity in comparison with liquid or solid resinous components, so that the pre-expansion of the liquid reactants minimizes the loss to the surrounding water of the exothermic heat energy required for proper curing. A further advantage of this invention is that simplified and highly portable equipment may be utilized for the practice of this invention in comparison with the complex and highly sophisticated processing machines required for the manufacture of cellular plastics by conventional liquid means.

In a preferred form of this invention, I also cause to be blended with the foam-forming ingredients when they are in their liquid state, a liquefied or compressed gas having, at the temperature of the surrounding water, a vapor pressure appreciably higher than the hydrostatic pressure at the depth where the foam is injected into the cavity to which buoyancy is to be imparted. Alternatively, I provide for heating the foam-forming ingredients and/or the expanding agent during its movement in conduits from the surface to the sunken vessel, so that although the vapor pressure of the expanding agent at the point of injection might not necessarily be above that of the hydrostatic pressure were the liquid components to be at or about the temperature of the surrounding water, the heating increases the temperature to a level at which the expanding agent does have a higher vapor pressure when forming the pre-expanded foam and injecting it into the vessel.

Pre-expansion of the liquid foam components may be achieved by several known methods, and several liquid products are capable of forming unicellular plastic foams, for example, polyurethanes, epoxides, polyesters, and formaldehydes. For purposes of description, polyurethane rigid foams will be used as an example, although this invention is not restricted to this particular plastic material.

Rigid polyurethane foams are produced by mixing an organic polyisocyanate with a polyhydroxy compound generally selected from products having three or more hydroxyl groups per molecule and with hydroxyl numbers ranging from 200 to 900. Relatively small quantities of tertiary amines and/or metallic salts of organic acids and other organo-metallic compounds may be utilized as catalysts in order for the reaction to achieve a desired reaction rate. Also, organo-silicone block copolymers are preferably used as surface active agents to assure the production of closed cells and to assist in making compatible the isocyanate and polyhydroxy component. With polyurethane materials, the cellular structure may be obtained by reaction of the isocyanate with water to form carbon dioxide which is then entrapped in the resinous mass and serves to expand it into froth. Alternatively, or in addition, relatively low boiling liquids or liquefied gases such as fluorocarbon 11 (monofluorotrichloromethane), fluorocarbon 12 (dichlorodifluoro methane), other fluorocarbons, carbon dioxide, liquid methane, other low boiling liquid hydrocarbons and organic chemicals, liquid oxygen, or liquid hydrogen may be used as expanding agents. Liquefied fluorocarbon gases and/or low boiling fluorocarbon liquids are especially useful in expansion of polyurethane and, for that matter, other cellular plastics in view of their inertness, their compatibility with the resinous foam-forming components, and their low cost. As a third method of providing the necessary expansion to a cellular structure, pressurized gases, either inert to or reactive with the foam-forming components, may be dissolved or dispersed in the plastic ingredients.

In the preparation of plastic foams from liquid ingredients, it is often convenient but not necessary to pre-blend the reactants, catalysts, surface active agents, and expanding agents into two pre-mixed components having stability in storage, and subsequently blending these two compounded products together to form the foam at the desired location. Such two component systems are commonly known in the trade as "foam-in-place systems." In the instance of polyurethanes one component contains the organic isocyanate and is referred to as the "prepolymer," while the other contains the polyhydroxy compound and is referred to as the "polyol blend." The blowing agent may be incorporated into either or both of these components or may be injected into either or both of them at the point where foam formation is desired.

In the present invention the rigid polyurethane foam is produced by a froth or pre-expansion process. In this process, a blowing agent which is normally gaseous at ambient pressure and temperature conditions, is blended in liquid form under pressure with one or both of the foam system components, or is injected into these components at the point where they are blended together. The present invention can use this froth or pre-expansion technique as an aid to imparting buoyancy to sunken objects, with concomitant advantages over the conventional foam formation by liquid means, as noted above.

Three principal methods may be used to obtain the desired objective. In the first, storage tanks for two liquid plastic-foam-producing components are carried on a surface vessel, and the components are fed to a suitable mixing means capable of operating above the hydrostatic pressure imposed by the depth at which the foam is to be formed. A third tank, also located at the surface, contains the pressurized or liquefied blowing agent which is led to the mixing device as a third stream and is there intimately blended with the other two components under pressures substantially higher than that of the hydrostatic pressure at the desired depth, the blended materials then being forced through a restriction means that prevents entrance of water into the mixing area. At the outlet of the restriction means they instantaneously expand to form the desired cellular product without appreciable contact of the mass of the cellular material with the water.

In the second and often more desirable method, the compressed or liquefied expanding agent is pre-blended with either or both of the foam system components, these components being maintained under pressure in suitable pressurized storage tanks at the surface. Mechanical positive displacement pumps or pressurization of the containers with an inert gas may then be used to conduct the components to a mixing device in which components are mixed by the turbulence created from the pre-expansion of the liquid ingredients by virtue of the dissolved compressed or liquefied expanding agent. This method eliminates the necessity for mechanically-driven mixing means, which may be cumbersome or difficult to handle under conditions of salvage operations.

A third method, which is preferred under some circumstances, utilizes a helical, high shear mixer with a serrated chamber and a helically grooved rotor and depends upon the turbulent flow of the liquid foam components along an extended path in contact with a comparatively large volume of unincorporated gas. Separate injection of the gaseous expanding agent, whether liquefied or compressed, is normally utilized in this system, but pre-blended components, as described in the second method, may instead be used.

The use of pressurized cylinders is not restricted to their storage on the surface, for they may also be lowered into the water near the site of the foaming operation, thus minimizing the length of the lines required for transport of the foaming ingredients to the point where buoyancy is to be imparted to the sunken structure. The pressure vessels utilized for holding the foam system components under pressure may then be so constructed and filled with liquid ingredients that their overall specific gravity is greater than that of the water in which the foaming operation is to be conducted, the full cylinders being lowered to the point of the foaming operation while controlled by guide cables, and empty cylinders may be returned to the surface by their natural buoyancy, once emptied of their contents in the process of producing the cellular plastic. Suitable connecting means may be provided for these cylinders so that interchange of full for empty cylinders may be achieved under water with minimum effort and inconvenience.

Other objects and advantages of the invention will appear from the following description of some preferred embodiments of the invention.

In the drawings:

FIG. 1 is a diagram, not to scale, of a salvage system incorporating a method embodying the principles of the invention to impart buoyancy to a sunken vessel. Mechanical blending is employed.

FIG. 2 is a fragmentary diagram of the terminal portion of the plastic-dispensing system of FIG. 1 showing a modified form of that portion of the system, wherein the nozzle outlet is buried in previously expanded foam.

FIG. 3 is a view similar to FIG. 2 showing dispensing of the foam into plastic bags.

FIG. 4 is a view similar to FIG. 1 showing a modified form of system, employing blending by turbulence from partially pre-blended components.

FIG. 5 is a diagrammatic view in section of the mixing device of FIG. 4.

FIG. 6 is a view similar to FIG. 2 using the device of FIG. 5.

FIG. 7 is a diagrammatic view of another modified form of system.

FIG. 8 is a fragmentary view of another modification to the system of FIG. 7.

FIG. 9 is another fragmentary view of another modified form of FIG. 7.

As shown in FIG. 1, a salvage vessel or barge 20 may be equipped with a pair of tanks 21 and 22 each containing one or two mutually reactive foam-forming resinous ingredients 23 and 24 and a third tank 25 containing a compressed or liquefied gaseous expanding agent 26. For example, the ingredients 23 may be a resin or prepolymer; the ingredient 24 may be a polyl blend, possibly including some fluorocarbon-11 as a secondary expanding agent, and the primary expanding agent 26 may be fluorocarbon 12. Three pumps 27, 28, and 29 provide the necessary pressurization and metering of the three components 23, 24, and 26 in the proper ratio for reaction and expansion; these pumps 27, 28, and 29 operate at a pressure that overcomes the hydrostatic pressure at the depth of the sunken structure or vessel 30. Hoses 31, 32, and 33 lead from the outputs of the respective pumps 27, 28, and 29 to valves 34, 35, and 36 located at or near a mixing device 40. Heating of the foam system components may be achieved either in the storage tanks 21 and 22 or by means of in-line heating systems 37 incorporated within or around the hoses 31, 32, and 33. Recirculation of any one or all of the components to the storage tanks 21, 22, and 25 for equalization of operating pressures during periods when foam is not being processed or to provide continuous temperature control of the ingredients may be utilized by employing three-way valves 34, 35, and 36 in conjunction with an additional set of three hoses 41, 42, and 43 which recirculate material to their respective storage tanks 21, 22 and 25.

The mixing device 40, driven by a power cable 44, thoroughly blends the several components into a homogenous mass under substantially liquid conditions. Maintenance of pressures sufficient to restrain the expansion of the blended components is provided by a restriction means 45 near the outlet 46 of the mixing system 40, so that thorough and homogenous mixing of the components is achieved with minimum contact with the surrounding water prior to emergence of the components through the restriction means 45. The equipment is so designed that pre-expansion of the foam system components occurs immediately at the outlet of the restriction means 45 in a pre-expander housing 47 which minimizes contact of the foam with the surrounding water. The key difference in comparison with the Watson Patent 3,091,205 is that the foam is dispensed in pre-expanded form, though the foam is still formed at the underwater locus where it is dispensed. This difference makes salvage operations economically viable.

As shown in FIG. 2, the restriction means 45 may be located remotely from the mixing system 40 by means of an interconnecting hose 48, within which the foaming materials are maintained under either liquid or partially expanded condition. This enables the operator or diver to submerge the outlet 46 of the pre-expander housing 47 within a mass of previously dispensed foam 50 in the compartment 30, thus even further minimizing contact of newly formed foam with the water. The previously dispensed material 50 acts as a shield against additional water contact.

It has been found in the practice of this invention, that if the pre-expanded foam is simply dispensed into the compartment or cavity 30 to which buoyancy is to be provided, without regard to the position of the dispensing nozzle 47 with respect to previously dispensed foam material 50, the cellular plastic buoyancy material forms in relatively small pieces 51 (see FIG. 1), usually from one to ten inches in maximum dimension. However, since the pre-expanded liquid foam dispensed from the nozzle 47 immediately rises to the topmost surface of the cavity of compartment 30 to be filled, it is better to bury the output nozzle 46 within the previously dispensed foam 50. Not only does this minimize the degrading contact of the foam material with water but also it minimizes the loss of exothermic heat and provides a solid block of foam having minimum water absorption as well as optimum buoyancy characteristics.

The increased exothermic heat generation which results from this invention, whether or not the nozzle 46 is submerged in foam 50, is quite advantageous. It helps to lower the density of the final product. Also, since the heated gases obey Charles' Law, the greater the exotherm of the foam, the greater the expansion of the gases and hence of the foam. Furthermore, when the foam cools, a partial vacuum is established within the closed cells of the foam, the degree of vacuum depending on the vapor pressure of the blowing agent, the hydrostatic pressure under which the frothed foam is dispensed, and the peak exothermic temperature obtained. The higher the exothermic heat, the lower the ultimate differential pressure between the water and the foam, or the atmosphere and the foam, when the vessel is raised.

The important characteristics of this invention are achievable only by means of pre-expansion techniques in the foam-forming process, for no substantial initial buoyancy force exists for foam materials dispensed from process equipment in the form of a liquid; such liquids have a spcific gravity close to or slightly greater than that of water. For this reason, the pre-expansion techniques described herein are suitable for the economic practice of the art of underwater salvage, and, in fact, this is the first commercially feasible technique for the utilization of plastic foams for such applications. The system of this invention has actually been used successfully in salvage of sunken barges.

In place of dispensing the foam directly into water or even into previously placed foam, it may be desirable in some instances to dispense it into a series of plastic bags, filling one bag at a time. This structure is shown in FIG. 3 where the nozzle 46 is shown connected to an inlet 51 for a plastic or elastic bag 52. This method of dispensing does have the advantage of protecting the froth and foam 53 in the bag 52 from the water 54. When using the technique of FIG. 2 and even in some instances with the technique of FIG. 1, these plastic or elastomeric bags are usually not necessary and tend to become encumberances. However, where such precautions are advisable, this modification is indeed desirable.

In any instance, the froth material gradually displaces the water in the compartment 30, imparting buoyancy compartment by compartment until the vessel floats to the surface. Once at the surface, the foam is readily removed by burning torches or by mechanical severance, removal being done only after steps have been taken to prevent the vessel from again sinking.

In FIG. 4 pressurized storage tanks 61, 62 are utilized on a surface vessel 60 to maintain foam system components containing pre-blended pressurized or liquefied expanding agent, such as one of the fluorocarbons. In this example, they are also pressurized by means of an inert gas (such as nitrogen) in a tank 63 to overcome hydrostatic head and friction loss pressures to the depth at which the mixing equipment is to be operated. Two hoses 64 and 65 lead from the individual storage tanks 61, 62 to respective pressure compensated, variable orifice, flow control valves 66 and 67, and from there into a simplified mixing chamber 70 (see FIG. 5) which relies on the turbulence created by the expansion of the individual foam system components for thorough blending. The simplified mixing chamber 70 interposes between an outlet 71 and the inlet 66 and 67 a series of baffles 72 which induce the required turbulence. It has been found that no pressure restriction is required at the outlet 71 when using this form of mixing device, for the baffles 72 appear to be quite sufficient for this purpose. The foam emerges at an outlet 71 from the mixing system in the form of a pre-expanded or "froth" material having a substantially lower specific gravity (e.g., 0.04 to 0.14) than that of the surrounding water. As shown in FIG. 6 the nozzle 71 may be buried in previously dispensed foam 73 in a practice similar to that shown in FIG. 2.

FIG. 7 depicts a similar system utilizing pressurized containers 81, 82, which may be lowered from a barge 80 to the operating depth by means of cables 83 and connected by lines 84 and 85 to a mixing means 86 similar to the device of FIG. 5. Full containers may be substituted for empty ones whose contents have been exhausted, and the empty ones returned to the surface by means of their own natural buoyancy, or they can be raised by the cable 83 secured to the barge 80.

FIG. 8 shows that in a system like that of FIG. 7, a diving bell 87 can be employed for lowering the containers 81 and 82. If the diving bell 87 is used, the containers 81 and 82 do not need to be held down by ballast or lines when they are nearly empty.

FIG. 9 shows a mixing head 90 which may be of the helical high-shear type. Also, this head 90 is shown as remotely controlled from the surface by an underwater propulsion device 91 which by means of electrically driven propellers or compressed gas jets can manipulate the mixing head 90 without the assistance of a human diver, and a closed circuit television camera 92 can be used to observe the position of the nozzle 90. This may be done in other systems, but it is especially convenient in a system like that of FIG. 7.

It will be apparent to those skilled in the art that a number of variations in the chemical nature of the foaming components as well as the equipment used to apply them under the scope of this invention may be used and the scope of this invention is not limited by the foregoing but is rather measured by the claims appeded hereto.

I claim:

1. A method for imparting buoyancy to a sunken structure by introducing a closed-cell expanded plastic material into suitable enclosures within said structure, said method being characterized by pre-expanding and mixing a plurality of liquid plastic-foam-forming ingredients and an expanding agent selected from the group of compressed and liquefied gases under water adjacent the point of introduction prior to substantial contact with the surrounding water so as to convert substantially all of the mixing into a buoyant foam, and then introducing the buoyant foam so formed into said enclosures so as to displace water from the enclosures both by said initial pre-expansion and by any secondary expansion.

2. The method of providing buoyancy to a sunken vessel having compartments, comprising the steps of chemically reacting a plurality of cellular foam-forming reactants and blending them with expanding agents selected from the group consisting of compressed and liquefied gases, forming substantially all of the blend into a fluid water-resistant closed-cell cellular structure under water while shielding said structure from appreciable contact of the foam-forming ingredients with the surrounding water, and then dispensing said cellular structure while still fluid into one or more compartments of said vessel.

3. The method of imparting buoyancy to a submerged object by introducing within the submerged object cellular plastic foam material capable of displacing the water from said object, characterized by substantially all said plastic foam being in an expanded froth state prior to contact with the surrounding water, said plastic foam being formed under water and in close proximity to the portion of said object to which buoyancy is to be imparted, said plastic foam being produced from a plurality of plastic forming reactants blended with compressed or liquefied blowing agents having a vapor pressure greater than the hydrostatic pressure at the depth at which the cellular plasic foam is to be formed.

4. The method of claim 3 comprising dispensing said foam material within a protective mass of previously dispensed said foam material, thereby minimizing contact with water by the newly introduced foam.

5. The method of claim 3 wherein the necessity of underwater operation by a human being is obviated by a diver initially positioning the issuance of said foam into the water within the sunken vessel and controlling the position and attitude of all subsequent operations from the water surface.

6. The method of imparting buoyancy to a submerged object comprising the steps of blending a gas under pressure with each of two plastic-foam-forming ingredients, each resulting blend having a vapor pressure greater than the hydrostatic pressure at the depth at which it is to be released into said object, conveying each said blend at said pressure to said object, then mixing said blends together at said depth, expanding said gas and thereby causing the reactants to substantially instantaneously expand into a froth, and dispensing said froth into said object in a substantially liquid expanded and partially cured state, and subsequently completing the curing of said liquid pre-expanded plastic froth to a solid, substantially unicellular plastic foam, which displaces water from said object by expansion, thereby providing buoyancy.

7. A method of raising sunken ships by introducing a series of flattened bag-like containers into a said ship, reacting and pre-expanding liquid plastic-foam-forming ingredients and an expanding agent selected from the group consisting of compressed and liquefied gases under water adjacent the inlets to said containers while preventing contact of said ingredients and of the resultant buoyant foam with the surrounding water, and then introducing the buoyant foam so formed as a pre-expanded froth into said containers to fill and enlarge said containers and to displace water from said ship.

8. The method of imparting buoyancy to a submerged ship comprising the steps of blending a gas under pressure with each of two plastic-foam-forming ingredients in two separate containers, each resulting blend having a vapor pressure greater than the hydrostatic pressure at the depth at which it is to be released into said ship, lowering said containers below water to a locus adjacent said ship, conveying each said blend at said pressure from said containers to said ship, then reacting said blends together at said depth, thereby causing the reactants to substantially instantaneously expand into a froth, and dispensing said froth into said object in a substantially liquid expanded and partially cured state, and subsequently completing the curing of said liquid pre-expanded plastic froth to a solid, unicellular plastic foam, which displaces water from said object by expansion, thereby providing buoyancy.

9. The method of providing buoyancy to a sunken vessel having compartments, comprising the steps of reacting below water at the depth of said vessel a plurality of cellular foam-forming reactants and expanding agents selected from the group consisting of compressed and liquefied gases, forming substantially the whole thereof into a water-resistant substantially closed-cell cellular froth structure under water while shielding said froth structure from appreciable contact with the surrounding water, and then dispensing said cellular froth structure into one or more compartments of said vessel by the pressure of said gases.

10. The method of claim 2 wherein one plastic-foam-forming reactant is a polyisocyanate and wherein said expanding agent is a fluorocarbon gas.

References Cited by the Examiner

UNITED STATES PATENTS

| 2,060,670 | 11/1936 | Hartman. |
| 2,989,938 | 6/1961 | Patterson _____ 114—50 |

FOREIGN PATENTS

| 179,943 | 7/1962 | Sweden. |

References Cited by the Applicant

UNITED STATES PATENTS

| 908,016 | 12/1908 | Lake. |
| 1,848,581 | 3/1932 | Stein. |
| 2,989,938 | 6/1961 | Patterson. |
| 3,057,694 | 10/1962 | Kessler |
| 3,091,205 | 5/1963 | Watson. |

FOREIGN PATENTS

| 995,768 | 12/1951 | France. |
| 950,050 | 10/1956 | Germany. |

MILTON BUCHLER, *Primary Examiner.*

T. M. BLIX, *Assistant Examiner.*